(No Model.) 2 Sheets—Sheet 1.

C. H. MYERS & H. C. ROSE.
STATIC MACHINE.

No. 589,742. Patented Sept. 7, 1897.

WITNESSES
Edw. D. Duvall Jr.
James R. Mansfield

INVENTORS:
Cornelius H. Myers,
Henry C. Rose.
By Alexander Howell Attorneys.

(No Model.) 2 Sheets—Sheet 2.
C. H. MYERS & H. C. ROSE.
STATIC MACHINE.

No. 589,742. Patented Sept. 7, 1897.

WITNESSES
INVENTORS:

UNITED STATES PATENT OFFICE.

CORNELIUS H. MYERS AND HENRY C. ROSE, OF SOUTH BEND, INDIANA.

STATIC MACHINE.

SPECIFICATION forming part of Letters Patent No. 589,742, dated September 7, 1897.

Application filed December 5, 1896. Serial No. 614,621. (No model.)

*To all whom it may concern:*

Be it known that we, CORNELIUS H. MYERS and HENRY C. ROSE, of South Bend, St. Joseph county, Indiana, have invented certain new and useful Improvements in Static Machines; and we hereby declare that the following is a full, clear, and exact description thereof, reference being had to the accompanying drawings, which form part of this specification.

This invention is an improvement in electromedical apparatus, and its object is to enable the machine to always produce static currents without regard to the condition of the exterior atmosphere; and another object is to provide a simple and effective apparatus for producing ozone or ozonized air from and by such static machine.

The invention therefore consists in the novel construction and combination of parts set forth in the claims, and the accompanying drawings illustrate the invention as adapted to a Wimshurst machine.

Figure 1:
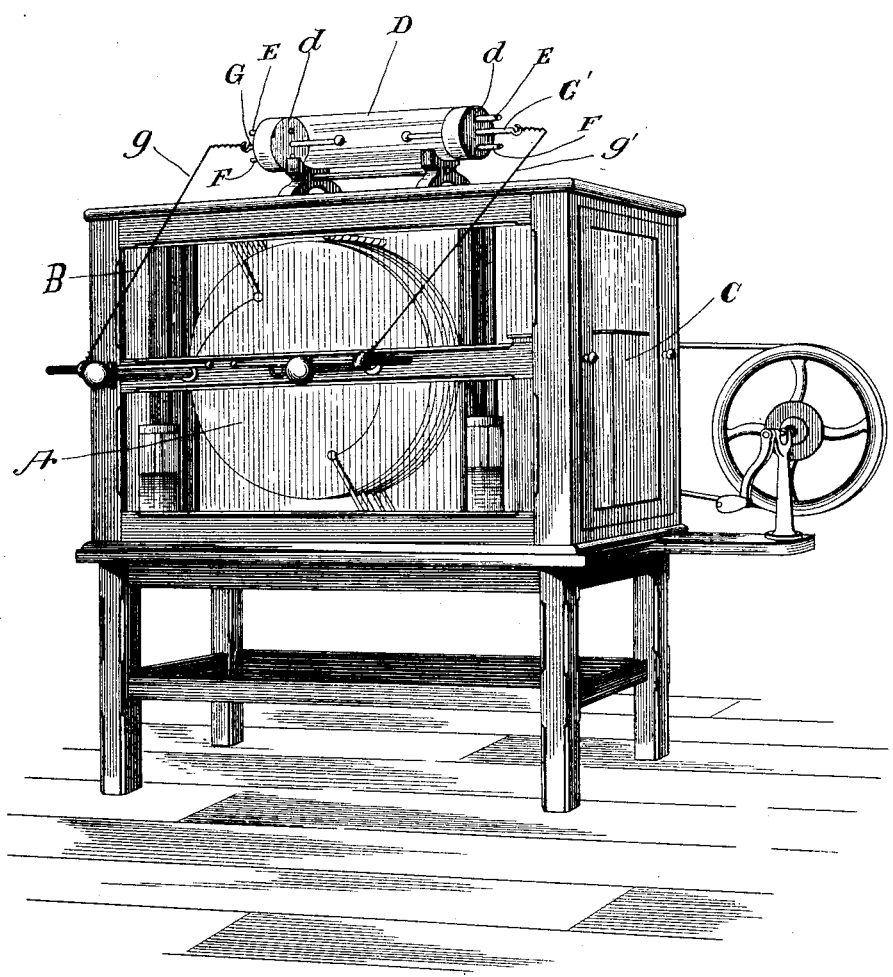
Figure 2:
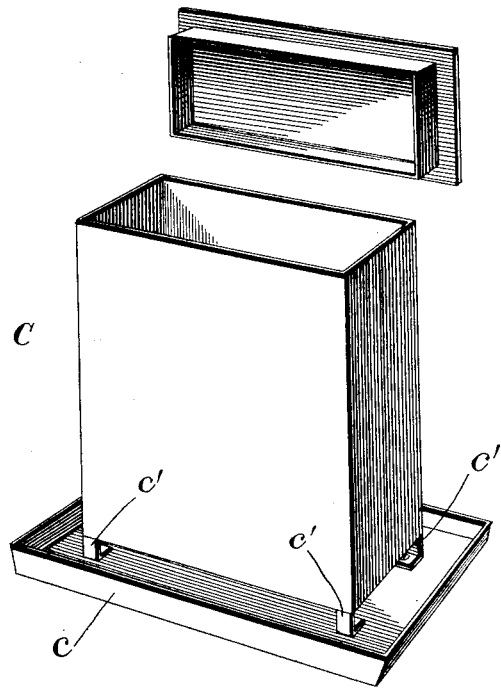
Figure 3:
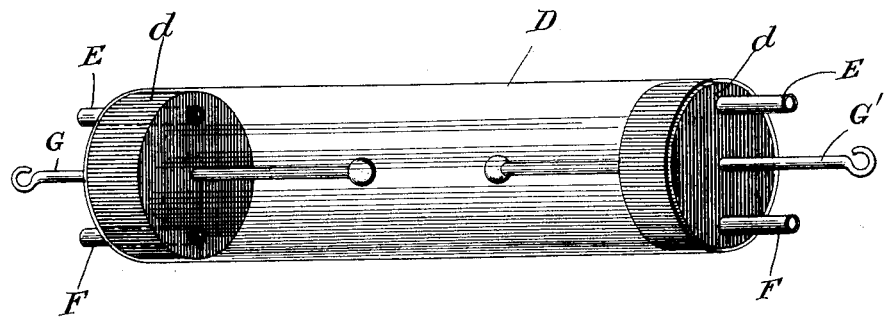

In said drawings, Figure 1 is a perspective view of the complete apparatus. Fig. 2 is a perspective view of the refrigerating-tank detached, and Fig. 3 is a perspective view of the ozonizing tube or chamber detached.

The static machine as ordinarily constructed is sensitive to the condition of the atmosphere. When there is moisture in the air, the machine will fail to generate and has to be dried out and recharged. To accomplish this purpose many devices have been resorted to. Ordinarily the main machine is inclosed in a glass case with a small auxiliary recharging-machine, which latter is for the purpose of recharging the main machine when it has lost its generating power by reason of dampness in the inclosed air. In many of these machines the discharge is used to produce ozone, and in these inclosed machines this ozone is generated within the air-tight glass case which incloses the machine itself, and as the ozone is a very active form of oxygen it attacks and rapidly corrodes all of the metal portion of the apparatus within the case.

The present invention therefore has for its object the production of a static machine for generating ozone which shall not be liable to these defects.

In the drawings, A designates a static generator of the Wimshurst type inside of a glass case B. The auxiliary recharging-machine in this improved machine is omitted entirely, and in its stead is placed a tank C, (shown more clearly in Fig. 2,) which is provided with a drip-pan c, attached to the tank beneath by lugs c'. Within this tank is placed a freezing mixture of ice and salt or any other combination of materials that will reduce its walls to a temperature considerably less than the temperature of the inclosed atmosphere of the case containing the machine. When this condensing-tank is used and placed inside of the machine, as shown in Fig. 1, all the surplus moisture of the inclosed air will be condensed upon the surface of the tank and retained there in the form of frost, and the inclosed air is thus deprived of moisture, so that it will not affect the generating capabilities of the machine, and with this kind of an inclosure or with a case provided with this appliance the machine will generate electricity in a satisfactory manner, whatever the condition of the weather or the external atmosphere.

Now, instead of generating the ozone in the air within the glass case containing the generating-plates, we provide a glass cylinder D, (shown more clearly in Fig. 3,) which has vulcanite ends $d$. Each of these vulcanite ends is provided with an entrance-tube E and an exit-tube F, and through the center of each of these ends, which can be screwed or otherwise secured in an air-tight manner to the glass cylinder B, passes the electrodes G G'. These may have any form of terminals desired, either the ordinary ball or a ball on one of the electrodes and a disk on the other. The electrode G may be connected by a conductor $g$ to the positive brush or pole of the machine and the electrode G' connected by a conductor $g'$ to the negative brush or pole of the machine. In practical use one of the tubes, as E, is connected with the outside air, which is introduced thereby into the cylinder, and one of the other tubes, as F, is connected with an inhaling-tube, (not shown,) by means of which the air after being ozonized by means of the discharge between the electrodes can be withdrawn or inhaled. The second set of tubes E and F are simply duplicates of the first, so that two people can use the apparatus at the same time, instead of one, or it is evident that any number of exit and entrance tubes may be inserted through the vulcanite ends.

With this device, the machine being set in action, the electricity passes up into the glass chamber B, discharges between the electrodes, and ozonizes the air that is therein contained. This air is withdrawn and can be stored in suitable receptacles or can be inhaled directly by the person who is being treated by the ozonized air and a fresh quantity of air is introduced, which is again ozonized by the spark discharge between the electrodes, and thus ozone can be continually generated and a continuous supply of medicated air maintained.

Cylinder D may be fastened upon the top of case B by any suitable means of support or in other convenient position.

This combination of a refrigerating-tank with the generating-plates inclosed in an airtight chamber with a glass cylinder containing the electrodes and within which the discharge takes place, provided with means for supplying the interior of this cylinder with fresh air and means for withdrawing the ozonized air therefrom, forms a simple and practical machine which will work in all kinds of weather and never fail to generate and will keep up a continuous supply of ozonized air as long as the machine is kept in operation.

Having thus described our invention, what we therefore claim as new, and desire to secure by Letters Patent thereon, is—

1. The combination with a machine for generating static electricity, and an inclosing case therefor; of means for refrigerating or reducing the temperature of the air in the case, substantially as and for the purpose set forth.

2. The combination of a machine for generating static electricity, and a case inclosing such machine; with a tank in said case containing a refrigerant, substantially as and for the purpose described.

3. The herein-described electrotherapeutic apparatus, consisting of a machine for generating static electricity, a case inclosing said machine, and means for refrigerating or reducing the temperature of the air in said case; with a closed glass chamber exterior to the case, opposite electrodes in the ends of said chamber respectively connected with the positive and negative brushes or collectors of the machine; and means for introducing air into and withdrawing air from the chamber, all substantially as and for the purpose described.

In testimony that we claim the foregoing as our own we affix our signatures in presence of two witnesses.

CORNELIUS H. MYERS.
HENRY C. ROSE.

In presence of—
JAMES DUSHANE,
EDWARD F. DUBAIL.